No. 850,564. PATENTED APR. 16, 1907.
J. J. COIT.
AIR BRAKE MECHANISM.
APPLICATION FILED NOV. 15, 1906.
2 SHEETS—SHEET 1.
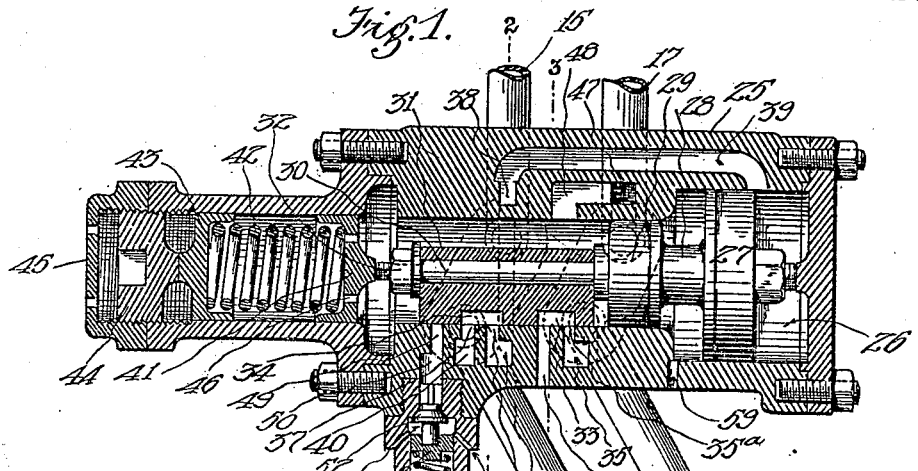
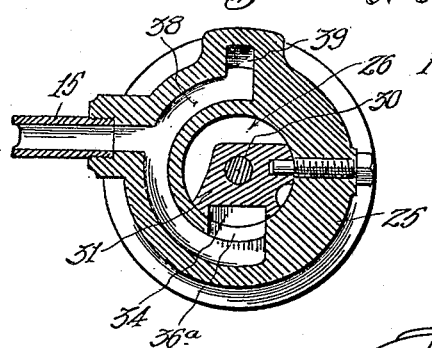   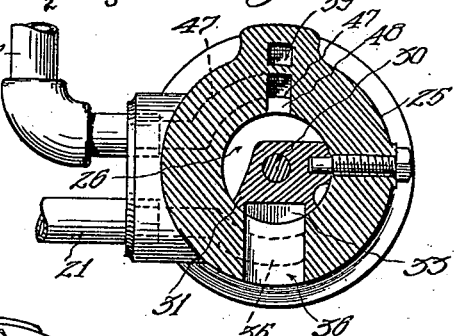
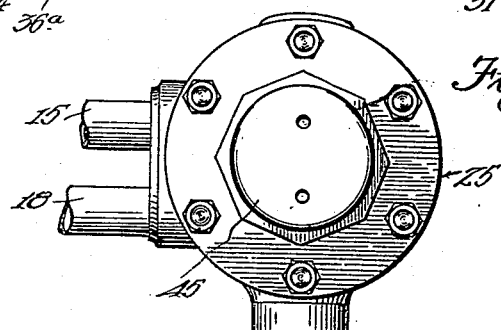
Witnesses.
Inventor
John J. Coit,
By Harris & Harpham
Attys.

No. 850,564. PATENTED APR. 16, 1907.
J. J. COIT.
AIR BRAKE MECHANISM.
APPLICATION FILED NOV. 15, 1906.
2 SHEETS—SHEET 2.
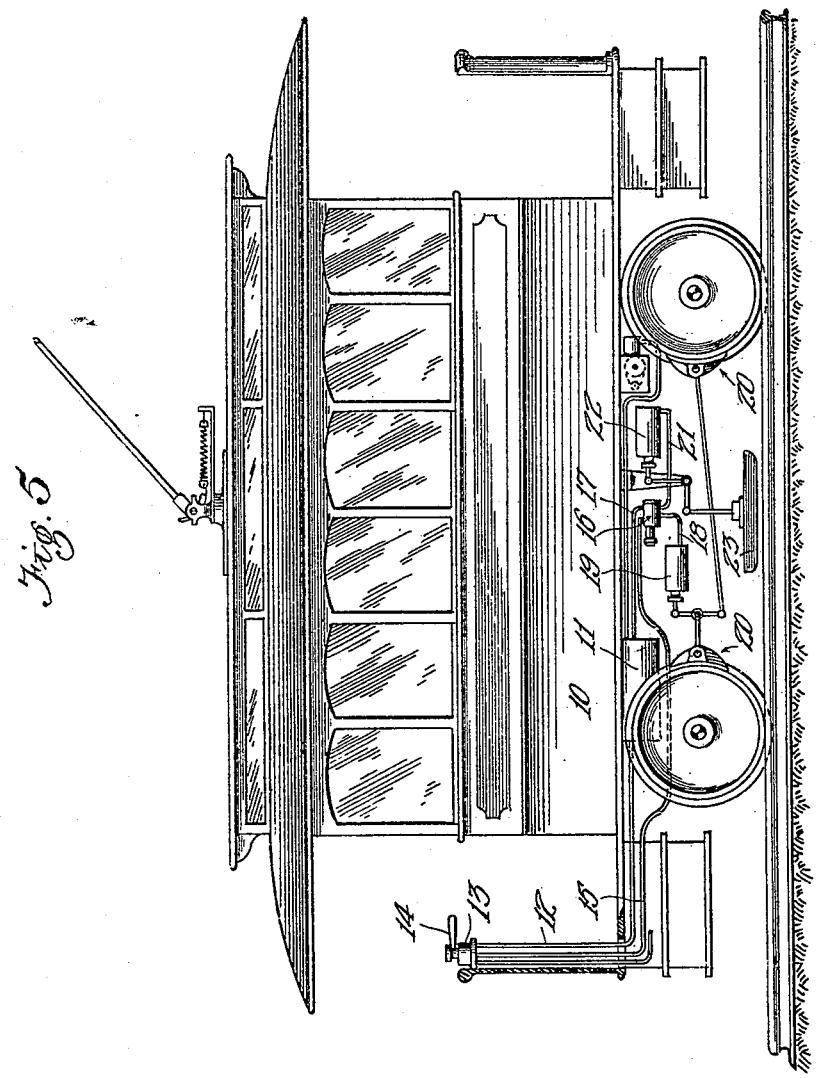

UNITED STATES PATENT OFFICE.

JOHN J. COIT, OF VENICE, CALIFORNIA.

AIR-BRAKE MECHANISM.

No. 850,564.    Specification of Letters Patent.    Patented April 16, 1907.

Application filed November 15, 1906. Serial No. 343,560.

*To all whom it may concern:*

Be it known that I, JOHN J. COIT, a citizen of the United States, residing at Venice, in the county of Los Angeles and State of California, have invented new and useful Improvements in Air-Brake Mechanism, of which the following is a specification.

My invention relates to an air-brake mechanism provided with the ordinary braking mechanism and in addition thereto a supplementary or emergency braking mechanism in which the brakes will engage the track and will only be thrown into engagement therewith after the maximum braking power of the ordinary brake has been used; and the object of my invention is to provide a supplemental or emergency brake of great power which may be thrown into use when more braking force is required than is provided by ordinary air-braking mechanism. I accomplish this object by the mechanism described herein and illustrated in the accompanying drawings, in which—

Figure 1 is a longitudinal central section of the triple valve by means of which the different brakes are operated. Figs. 2 and 3 are sections on the lines 2 and 3, respectively, of Fig. 1. Fig. 4 is an end elevation. Fig. 5 is a side elevation of a car equipped with my improved braking device.

Referring to the drawings, (see Fig. 5,) 10 is the body of a street-railway car to which is secured the compressed-air reservoir 11, which is supplied with compressed air in the usual manner. Leading from the compressed-air reservoir is a pipe 12, which is connected to a threeway or motorman's controller-valve 13, which valve is operated by a lever 14. A pipe 15 connects the controller-valve to my improved triple valve 16, which is also connected by pipe 17 to the compressed-air reservoir. A pipe 18 connects my improved triple valve with the wheel-brake piston-chamber 19, having a piston therein which operates the wheel-brakes 20 in the usual manner. My improved triple valve is also connected by pipe 21 with the track-brake piston-chamber 22, having a piston therein which operates the track-brakes 23, as hereafter explained. In the casing 25 of the triple valve is a piston-chamber 26, which has an enlarged front end in which is mounted piston 27, having a stem 28, to which is secured piston 29, which has a working fit in the smaller part of chamber 26. A stem 30 is secured to piston 29, and on said stem 30 is mounted a slide-valve 31, which is held in place by a nut 32. In the bottom of this slide-valve are cup-shaped recesses 33 and 34. Recess 33 connects channel 35 through port 35$^a$ with exhaust-port 36 when the brakes are in their released position. Pipe 21 opens into channel 35, thereby throwing the track-brake piston-chamber to exhaust when the brakes are in their released position. Recess 34 connects ports 36$^a$ and 37, as shown in Fig. 1, when the brakes are in their released position. Port 36$^a$ is connected to or opens into the channel 38, and pipe 15 is also connected to and opens into said channel 38. Channel 38 is connected by channel 39 with the enlarged or front end of chamber 26 in front of piston 27, so that when air is admitted through pipe 15 it will exert pressure on the front end of the piston 27, and at the same time the air will pass through port 37, which last port opens into channel 40, into which last channel pipe 18 is connected, thereby applying the wheel-brakes. A follower 41 is mounted in the rear portion of chamber 26 and provides a bearing-piece for the front end of spring 42, the rear end of which rests against a follower 43, which is held in place by nut 44, by means of which the tension of spring 42 is regulated. The tension of spring 42 is set at whatever pressure is desired for a service application. A dust-cap 45, which operates as a lock-nut, is placed on the end of this nut. Follower 41 has ports 46 therein. Pipe 17 is connected to and opens into a channel 47, which last channel is connected to a channel 48, which opens into chamber 26 at the rear of piston 29, whereby piston-chamber 26 at the rear of piston 29 is provided with compressed air from the compressed-air reservoir.

In the operation of my device when it is desired to set the brakes on the cars the motorman turns the controller-valve, so as to admit air from reservoir 11, through pipes 12 and 15, into the wheel-brake piston-chamber and at the same time into the front end of chamber 26. As much air is admitted as may be required to give the wheel-brakes their desired braking power, which at its maximum is what I term a "service application." If the service application will not be sufficient to check the momentum of the car in time, the motorman still continues to apply the air, thereby increasing the pressure on the piston 27, which overcomes the tension of spring 42, and thus causes the pistons to move toward the rear of the chamber, thereby carrying the slide-valve to cut off the communication between the exhaust-port 36 and port 35ᵃ and uncovering said port, so that the air-pressure from the reservoir will now flow direct through pipe 21 to the track-brake piston-chamber, thereby setting the track-brake. The movement of the slide-valve also disconnects ports 36ᵃ and 37 and connects port 37 with port 49. This last port opens into a channel 50, which leads to and opens into a chamber 51, in which is check-valve 52, which controls the communication into the chamber. Spring 53 bears against a follower 54, against which the stem of the check-valve rests. The other end of the spring rests against the follower 55, and the nut 56 is provided to regulate the tension of spring 53. A dust-cap 57, which is also a lock-nut, incloses the end of the nut. When the slide-valve has connected ports 37 and 49, any excess of air-pressure in the wheel-brake cylinder over the power of spring 53 escapes therefrom by unseating the check-valve and passing out through port 58. In the casing between pistons 27 and 29 is an exhaust-port 59, which keeps that portion of the chamber to exhaust, thereby enabling the pressure on piston 27 in emergency to overcome the pressure on piston 29 and the power of spring 42. When the car has been stopped, the controller-valve is turned to throw pipe 15 to exhaust, thereby releasing the pressure on piston 27, when the pressure on piston 29 and the power of spring 42 will return the slide-valve to its normal position, and the brakes will all release. If it is desired to retain the wheel-brake pressure, the pressure on piston 27 is reduced to only the pressure required to permit the return of the piston to its normal position when the track-brake will release; but the wheel-brake still holds. The further exhaust will then release the wheel-brakes in the usual manner.

Having described my invention, what I claim is—

1. The combination of a reservoir charged with fluid under pressure; a controller-valve; fluid-pressure-operated wheel-brake mechanism; fluid-pressure-operated track-brake mechanism; a triple-valve device having a plurality of ports and passages in the casing thereof; connections from said reservoir to said controller-valve and to said triple-valve device; connections from said triple-valve device to said controller-valve and to said wheel-brake mechanism, whereby fluid-pressure from the reservoir will pass through the controller-valve and through the triple-valve device to operate said wheel-brake mechanism; a second connection from said reservoir to said triple-valve device and a connection from said triple-valve device to said track-brake mechanism; and mechanism in said triple-valve device to cut off the fluid-pressure therethrough to the wheel-brake mechanism and to permit the flow of fluid-pressure to the track-brake mechanism when the pressure in the triple-valve device reaches a predetermined point.

2. The combination of a reservoir charged with fluid under pressure; a controller-valve; fluid-pressure-operated wheel-brake mechanism; fluid-pressure-operated track-brake mechanism; a triple-valve device having a plurality of ports and passages in the casing thereof and mechanism therein, whereby the initial pressure will flow through the triple valve to the wheel-brake mechanism and when a predetermined pressure has been reached in the triple valve the flow of fluid-pressure to the wheel-brake mechanism will be cut off and the fluid-pressure will then flow through the valve to the track-brake mechanism; and connections between said parts.

3. In an air-brake mechanism, the combination of a reservoir charged with fluid under pressure; fluid-pressure-operated wheel-brake mechanism; fluid-pressure-operated track-brake mechanism; means for connecting said reservoir with said wheel-brake mechanism, whereby the initial pressure will operate the same; and means for connecting said reservoir with said track-brake mechanism and for cutting off the connection to said wheel-brake mechanism when there is an emergency application of brakes to be made.

4. The combination of a reservoir charged with fluid under pressure; a controller-valve; fluid-pressure-operated wheel-brake mechanism; fluid-pressure-operated track-brake mechanism; a triple-valve device having means therein to permit the initial pressure from said reservoir to pass to and operate said wheel-brake mechanism and when the pressure therein reaches a predetermined point to cut off the pressure to the wheel-brake mechanism and establish communication between said reservoir and said track-brake mechanism.

5. In an air-brake mechanism, a triple-valve device having a plurality of ports and passages therein and having a chamber therein with the front end thereof of larger diameter than the other portion, said larger portion having an exhaust-port at the rear thereof; pistons in said chamber, one in the larger front end and the other in the reduced portion of the chamber, said piston being connected; a slide-valve having a plurality of recesses therein in the smaller end of said chamber at the rear of the pistons and operatively connected thereto; and a spring operating to resist the movement of the pistons toward the rear end of the chamber.

6. In an air-brake mechanism, a triple-valve device having a plurality of ports and passages therein and having a chamber therein with the front end thereof of larger diameter than the other portion; pistons in said chamber, one in the larger front end and the other in the reduced portion of the chamber; a stem connected to said piston; a stem carried by the smaller of said pistons; a slide-valve having a plurality of recesses therein; a spring in the smaller end of the chamber; and a relief-valve connected to the smaller end of the chamber in the triple-valve and adapted to be thrown into communication with a port in the casing which is connected to the wheel-brake mechanism.

In witness that I claim the foregoing I have hereunto subscribed my name this 7th day of November, 1906.

JOHN J. COIT.

Witnesses:
G. E. HARPHAM,
EDMUND A. STRAUSE.